Sept. 14, 1948.    C. O. SLEMMONS ET AL    2,449,421
TRACK FOR VEHICLES
Filed July 30, 1945    2 Sheets-Sheet 1
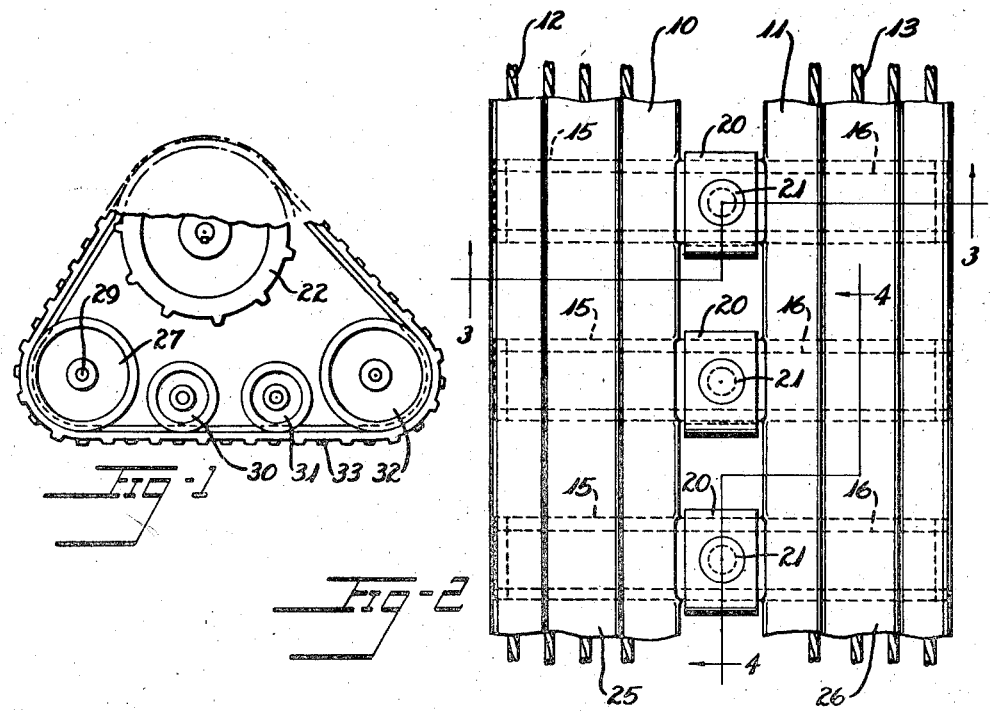
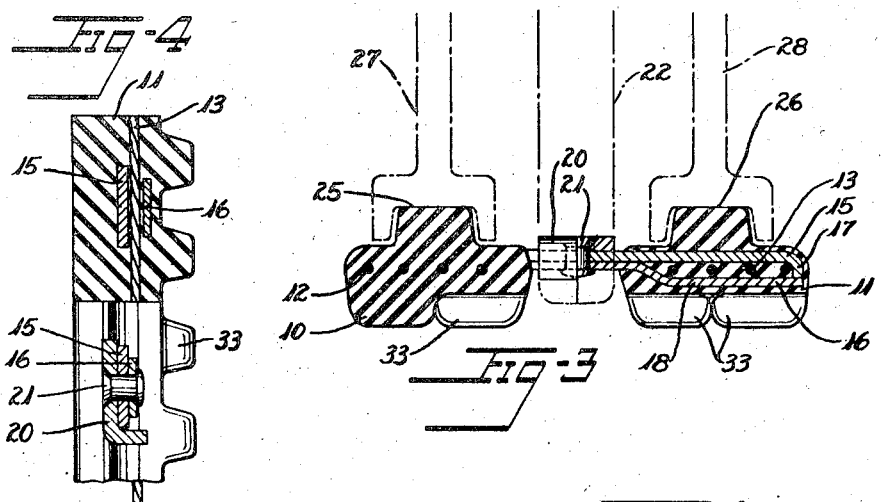
Inventors
Charles O. Slemmons
Robert W. Smith
By
Att Sept. 14, 1948.   C. O. SLEMMONS ET AL   2,449,421
TRACK FOR VEHICLES
Filed July 30, 1945   2 Sheets-Sheet 2
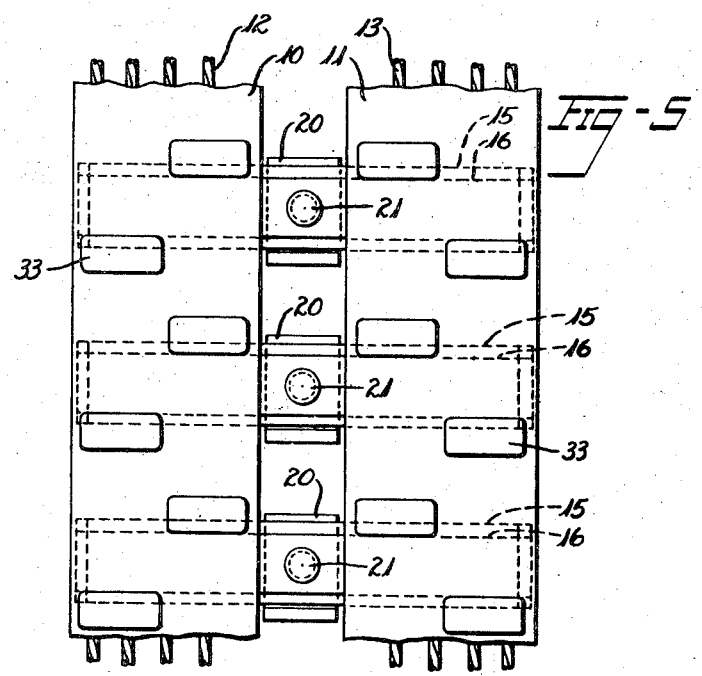
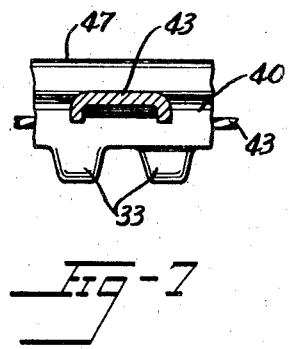
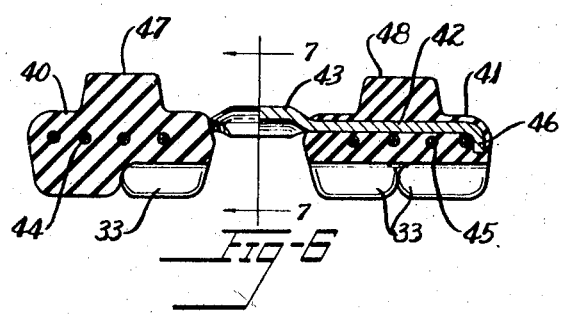
Inventors
Charles O. Slemmons
Robert W. Smith
By
Atty Patented Sept. 14, 1948

2,449,421

UNITED STATES PATENT OFFICE 2,449,421

TRACK FOR VEHICLES

Charles O. Slemmons, Akron, and Robert W. Smith, Copley, Ohio, assignors to The B. F. Goodrich Company, New York, N. Y., a corporation of New York Application July 30, 1945, Serial No. 607,690

3 Claims. (Cl. 305—10)

1

This invention relates to tracks for self-laying track type vehicles and is especially useful in the construction of tracks for agricultural tractors, although features of the invention are applicable to tracks for other vehicles.

The principal objects of the invention are to provide positive driving and smooth guiding of the track, to provide quiet operation, to provide high flexibility, and to provide simplicity of construction.

These and other objects will appear from the following description and the accompanying drawings.

Of the drawings:

Fig. 1 is a side elevation of a tractor drive with a track made in accordance with and embodying the invention, parts being broken away;

Fig. 2 is a plan view of a portion of the track as seen from the inner side of the track;

Fig. 3 is a cross-section of the track taken on line 3—3 of Fig. 2, with a drive sprocket and guide wheels shown in dot and dash lines;

Fig. 4 is a sectional view taken on line 4—4 of Fig. 2;

Fig. 5 is a plan view of a portion of the track as seen from the tread face thereof;

Fig. 6 is a cross-sectional view of a modified construction; and

Fig. 7 is a sectional view thereof taken on line 7—7 of Fig. 6.

Referring to the drawings, the numerals 10, 11 designate laterally spaced-apart bands preferably of soft vulcanized rubber or other rubber-like material. The band 10 is provided with longitudinally extending tension members 12, preferably of cord or wire cable, and the numeral 13 designates similar reinforcing elements of the band 11. Reinforcing elements 12 and 13 are preferably bonded to the rubber-like material of the bands through which they extend and are entirely enclosed by the rubber-like material whereby they are protected from corrosion or abrasion in use.

For supporting the bands in properly spaced-apart relation and for providing for positively driving the track, laterally extending cross bars 15, 16 are embedded in the rubber-like material of the bands at spaced-apart regular intervals along the track. The bars 15 have ends 17 bent toward the tread face of the track and the bars 16 are formed to lie in contact with the bars 15 across the space between the bands 10 and 11, but have offset end portions 18 which are spaced from the bars 15 between the downwardly turned ends 17 of the bars 16 and the portions of the

2 bars between the bands thereof, providing a space for receiving the tension members which are spaced from the bars 15 and 16 by resilient rubber-like material which completely surrounds the tension members.

For providing positive driving of the track, a wear plate 20 preferably of L-shape is fixed to the bars 15, 16 between the bands 10 and 11 and is secured thereto by fastener elements such as rivets 21 extending through the bars. The wear plates 20 are engaged by the teeth of a driving sprocket 22 of the vehicle for positive driving of the track.

To provide quiet operation, the bands 10 and 11 are formed with longitudinal rails in the form of continuous ribs 25, 26 on the inner face of the track for smooth rolling engagement with grooved pulleys or guide wheels 27, 28 respectively, the ribs being of greater depth than the grooves of the guide wheels and being of less width than the grooves of the guide wheels so as to contact positively with the guide wheels at the bottom of their grooves and cushion the load of the vehicle by providing continuous cushion rails for supporting the guide wheels.

Referring to Fig. 1, guide wheels 27, 28 are mounted for free rotational movement on a fixed axle 29 and in laterally spaced-apart relation so as to engage the ribs 25 and 26. Similar pairs of guide wheels 30, 31, 32, are similarly spaced on their shafts for engaging over the rails 25, 26 of the track, thereby providing continuous support at intervals throughout the ground engaging reach of the track. Due to the continuous nature of the guiding rails and their resilient structure the track is guided about the wheels with a minimum of noise and a high degree of cushioning, while positive driving of the track is accomplished entirely by the sprocket wheels 22 which engage the wear elements 20 mounted on the cross bars. This construction permits use of metal guide wheels. The depth of the resilient rails is such that in use any spreading of the rails due to loading will aid in fitting the grooves of the wheels without scuffing of the rubber.

The tension elements 12 and 13 may comprise successive convolutions of a single cable 44, or each convolution may be a separate endless grommet. The bars 15, 16 are secured to the tension members entirely by the resilient rubber therebetween, the intervening rubber providing for absorption of shock and reduction of vibration caused by the sprocket contacting the cross bars.

The track may be formed on its tread face with lugs 33, or other projections to increase the grip of the track with the ground.

Referring to the modification shown in Figs. 6 and 7, endless longitudinally extending bands 40, 41 of rubber or other rubber-like material similar to the bands 10 and 11 of the form of the invention previously described are held in spaced-apart relation by cross-bars 42 extending between the bands at longitudinally spaced-apart intervals along the track. Between the bands the bars 42 are formed with portions 43 of U-shaped cross section for engagement with the drive sprockets. Tension elements 44 of cable or cord are arranged to extend through the band 40 in spaced-apart relation and similar tension elements 45 are arranged in spaced-apart relation to extend longitudinally of the band 41. The ends of the cross bars 42 extend over the tension elements 44, 45 in spaced-apart relation thereto and are entirely embedded in the rubber-like material, the cross bars having turned down end portions 46 beyond the tension members but spaced therefrom and entirely enclosed by the rubber-like material. In this form of the invention the flexible bands 40, 41 of rubber-like material are formed respectively with continuous up-standing rails 47, 48 for guiding engagement with the guide wheels of the vehicle in the same manner as in the form of the invention previously described.

These and other modifications may be made without departing from the scope of the invention as it is defined by the following claims.

We claim:

1. A track for a self-laying track type vehicle, said track comprising laterally spaced-apart flexible bands of rubber-like material, longitudinal flexible tension members embedded in each band, and cross-bars extending laterally between the bands at longitudinally spaced intervals providing sprocket-engaging portions intermediate said bands, said cross-bars each comprising a strip of metal having plain-faced portions extending across the tension members of the bands between said tension members and the peripherally inner face of the track and having portions in the region of its ends bent outwardly beyond the tension members toward the tread face of the track and terminating in free ends within the rubber-like material of the bands.

2. A track for a self-laying track type vehicle, said track comprising laterally spaced-apart flexible bands of rubber-like material, longitudinal flexible tension members embedded in each band, and cross-bars extending laterally between the bands at longitudinally spaced intervals, said cross-bars each comprising a strip of metal having plain-faced portions extending across the tension members of the bands between said tension members and the peripherally inner face of the track and having portions in the region of its ends bent outwardly beyond the tension members toward the tread face of the track and terminating in free ends within the rubber-like material of the bands, portions of said cross-bars between the bands being of U-shaped cross section for engagement with a drive sprocket.

3. A track for a self-laying track type vehicle, said track comprising laterally spaced-apart flexible bands of rubber-like material, each band having a layer of substantially inextensible tension members extending longitudinally thereof, the bands each comprising a ground-engaging tread portion and a narrower continuous rail portion for engaging grooved guide wheels, and cross-bars extending laterally between the bands at longitudinally spaced intervals providing sprocket-engaging portions intermediate said bands, said cross-bars each comprising a single strip of metal extending across the tension members of the bands between said tension members and the peripherally inner face of the track and having portions in the region of its ends bent outwardly beyond the tension members toward the tread face of the track and terminating in free ends within the rubber-like material of the bands.

CHARLES O. SLEMMONS.
ROBERT W. SMITH.

REFERENCES CITED

The following references are of record in the file of this patent:

UNITED STATES PATENTS

| Number | Name | Date |
| --- | --- | --- |
| 1,400,100 | Reddaway | Dec. 13, 1921 |
| 2,107,490 | Mayne | Feb. 8, 1938 |

FOREIGN PATENTS

| Number | Country | Date |
| --- | --- | --- |
| 134,190 | Great Britain | Nov. 13, 1919 |